H. PITCHER.
COMBINED RIDGER AND BLOCKER.
APPLICATION FILED JAN. 2, 1917.
1,240,088.
Patented Sept. 11, 1917.
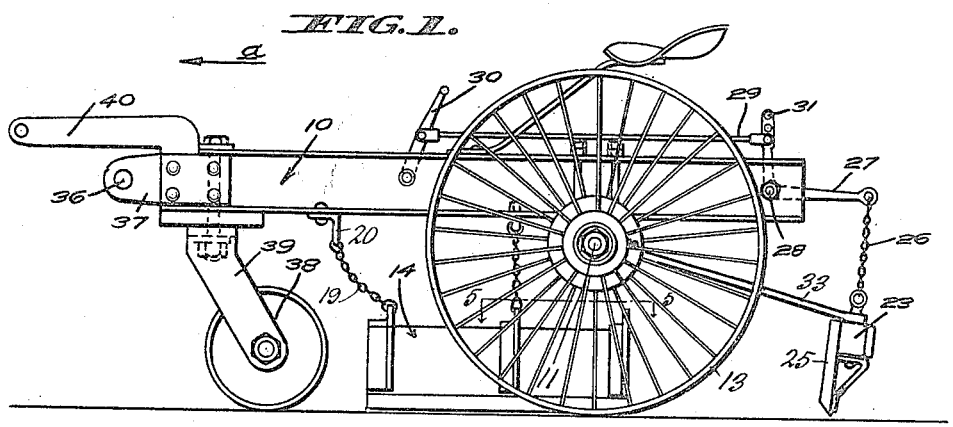
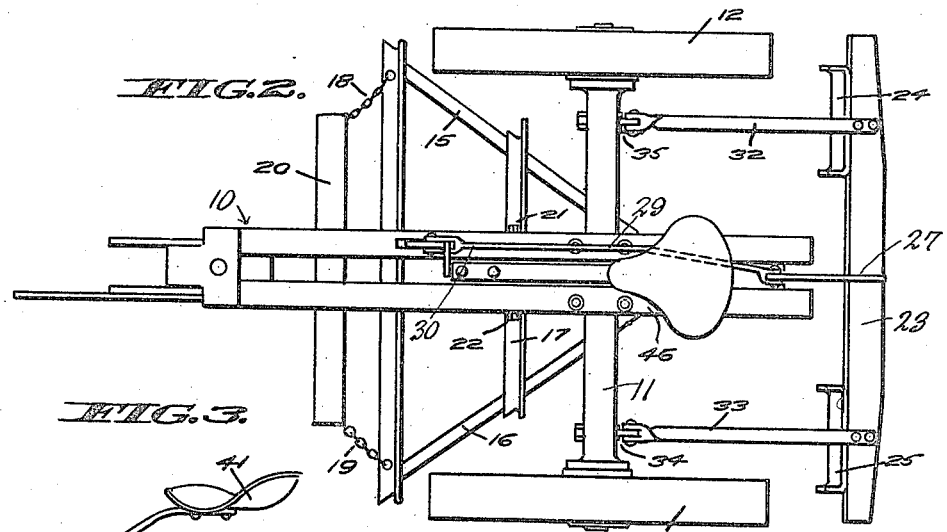
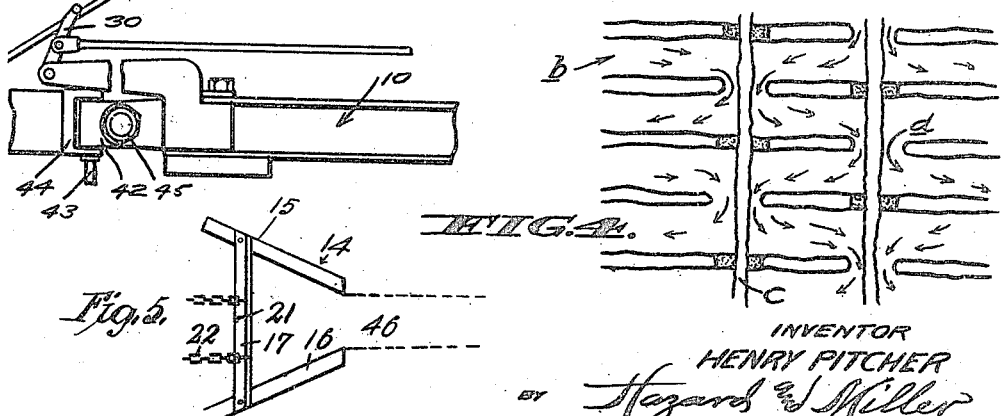
INVENTOR
HENRY PITCHER
BY Hazard & Miller
ATTORNEYS

UNITED STATES PATENT OFFICE.

HENRY PITCHER, OF ORANGE, CALIFORNIA.

COMBINED RIDGER AND BLOCKER.

1,240,088.  Specification of Letters Patent.  Patented Sept. 11, 1917.

Application filed January 2, 1917. Serial No. 140,261.

*To all whom it may concern:*

Be it known that I, HENRY PITCHER, a citizen of the United States, residing at Orange, in the county of Orange and State of California, have invented new and useful Improvements in Combined Ridgers and Blockers, of which the following is a specification.

This invention relates to an agricultural implement and particularly pertains to a combined ridger and blocker.

It is common in parts of the country where irrigation of farm land is necessary to use some form of plow or scraper to form ditches which will distribute water evenly over the land. This is done by a system known as checking, which includes the formation of lateral ditches and transverse ditches which cross each other and evenly distribute water over the land. It is also common to block some of these ditches so that the water will flow through predetermined channels and become more evenly distributed.

It is the principal object of this invention to provide an implement for forming ditches and blocking them during the course of their formation and as the implement advances.

Another object of this invention is to provide a combined ridger and blocker which will act in a simple manner to ridge the land to form the irrigation ditches and which may be controlled by the driver to selectively block the ditches.

Another object of this invention is to provide an agricultural implement of the above class which may be readily drawn by horse power or drawn by attachment to a farm tractor.

It is a further object of this invention to provide an irrigating implement which is composed of strong and durable parts and which may be readily operated and are not liable to require repair.

Other objects will appear hereinafter.

The invention is illustrated, by way of example, in the accompanying drawings in which:

Figure 1 is a view in side elevation illustrating the implement as adapted to be drawn by horse power.

Fig. 2 is a view in plan illustrating the device disclosed in Fig. 1.

Fig. 3 is a fragmentary view of the rear of a tractor or other motor vehicle and the forward end of the agricultural implement drawn thereby.

Fig. 4 is a diagrammatical view illustrating the way the ditches are arranged and blocked upon a piece of land.

Fig. 5 is a fragmentary top plan view of the rear end of the ridger, the point of vision being indicated by the line 5—5 of Fig. 1.

Referring more particularly to the drawings, 10 indicates central draw-beams which extend throughout the length of the implement and are supported upon an axle 11. The draw-beam 10 is built up from two I-beams rigidly mounted in parallel positions. This axle extends equi-distant each side of the draw-beams and is fitted with wheel spindles upon which are rotatably mounted wheels 12 and 13 upon which the structure is supported. Positioned below the drawbar and axle is a drag or ridger 14 which is here shown as being V-shaped and as having its wide end extending forwardly. This drag is composed of a pair of converging side boards 15 and 16 which are tied together by cross braces 17 at suitable intervals along their lengths. Chains 18 and 19 are secured to the forward end of the drag and are connected to a cross member 20. This member is mounted in rigid relation to the draw-beam 10 and is disposed thereunder. It will be evident that when the vehicle moves forwardly the cross beam and the chains will draw the drag. As a means for further connecting the drag to the body of the implement and providing vertical adjustment chains 21 and 22 are fixed to the drag adjacent its rear end and more firmly secure it to the draw-bar in its operative position.

Disposed in the rear of the wheels is a horizontal cross beam 23 at the outer ends of which are secured downwardly extending blocking scrapers 24 and 25. These scrapers are suitably reinforced and are adapted to perform the blocking operation, as will be hereinafter described. The beam 23 is supported mid-way its length by a chain 26 which connects with the outer end of a bell crank 27 pivotally mounted upon a pin 28. This pin is fixed within the rear end of the draw-beams 10 and permits the bell crank to be oscillated by a draw-bar 29 which extends forwardly to a foot pedal 30. The upwardly extending leg of the bell crank 27 is formed with a series of bolt holes 31 which affords adjustment for the rod 29 and permits variation in the lift of the scrapers. As a means for maintaining the cross beam 23 in horizontal alinement and in parallel relation to the axle 11, radius rods 32 and 33 are secured by their one ends to the outer ends of the beam and by their other ends to eyes 34 and 35 fixed to the axle, at which points they are pivoted so that the beam may have substantial radial movement in relation to the axle.

When it is desired to draw the implement by horse power a double-tree is fastened to the eye 36 of yoke 37. This yoke is mounted at the forward end of the draw-beam and permits the structure to be directly drawn thereby. A caster wheel 38 is mounted between the arms of a fork 39 and provided with horizontal pivotal movement beneath the forward end of the beam 10 which it is adapted to support when the implement is drawn by horses.

It may be found convenient to propel the implement by connecting it to a farm tractor or other motor vehicle, for which purpose the forwardly extending connecting arm 40 is fixed to the beam 10 to provide a pivotal mounting for the foot lever 30 which is then mounted in a position accessible from the tractor seat 41. A coupling block 42 is mounted by a coupling pin 43 to a yoke 44 secured to the rear end of the tractor. This block is provided with a pin 45 which engages yoke 37 of the agricultural implement and thus permits the implement to have universal movement in relation to the tractor.

In operation, the implement is drawn forward in the direction of the arrow —a— by suitable power. The drag 14 is allowed to rest upon the loose soil and will act to gather the dirt and ridge it between the side boards 15 and 16, the rear ends of which are spaced a distance from each other to form a ridge throat 46. As the vehicle advances, the ridge will be centered below the draw-beams 10 and the two adjacent sides of two ditches will be formed thereby. It will be assumed that the ditches thus formed will be as indicated by the arrow —b— in Fig. 4 of the drawings. After the field has been laid off into a series of these parallel ditches, the implement is then drawn crosswise of the field and the transverse ditches —c— will be formed. It is desirable to block the transverse ditches at given points along their length and this is done by manipulating the pedal 30 to lower the scrapers 24 and 25. As the vehicle moves forward with the scrapers lowered, sufficient dirt will be drawn into the ditch to complete the transverse ridge and block the field to produce a flow of water as indicated by the arrows —d— in Fig. 4. After the blocking operation, the pedal may be depressed and will thereby elevate the scrapers.

It will thus be seen that the agricultural implement here provided is simple in its action and may be readily operated by a driver mounted upon the seat of the implement and without the assistance of other attendants.

While I have shown the preferred construction of my ridger and blocker as now known to me, it will be understood that various changes in the combination, construction, and arrangement of parts may be made by those skilled in the art without departing from the spirit of my invention.

I claim:

In an agricultural implement, an axle, wheels upon the ends of the axle, a draw-bar rigidly connected with the axle, a ridger mounted between the wheels and connected to the draw-bar, said ridger including two scraping side boards extending from points in front of the wheels inwardly and backwardly, there being a space between the rear ends for a ridge of dirt to pass, a horizontally disposed cross-beam mounted in the rear of the ridger and adapted to be raised and lowered, and blocking scrapers mounted upon the ends of the cross-beam.

In testimony whereof I have signed my name to this specification.

HENRY PITCHER.